United States Patent [19]
Rechtsteiner et al.

[11] 3,918,678
[45] Nov. 11, 1975

[54] ASEPTIC BULK MATERIAL STORAGE SYSTEM AND IMPROVED ASEPTIC VALVE THEREFOR

[75] Inventors: Steve A. Rechtsteiner, Cincinnati, Ohio; Philip E. Nelson, West Lafayette, Ind.; Marinus deBonte, Mississanga, Canada

[73] Assignee: Purdue Research Foundation, Lafayette, Ind.

[22] Filed: May 6, 1974

[21] Appl. No.: 467,460

[52] U.S. Cl. .................................. 251/144; 251/214
[51] Int. Cl.² ................... F16K 41/00; F16K 51/00
[58] Field of Search .................... 251/144, 148, 214; 137/238, 375; 277/135, 59

[56] References Cited
UNITED STATES PATENTS

| | | | |
|---|---|---|---|
| 1,258,903 | 3/1918 | Howard | 137/375 |
| 1,923,306 | 8/1933 | Hagen | 137/375 X |
| 2,202,735 | 5/1940 | Johnson | 137/375 |
| 2,469,109 | 5/1949 | Goecke | 137/375 |
| 3,159,377 | 12/1964 | Samour | 137/375 X |
| 3,211,422 | 10/1965 | Brown | 251/144 |
| 3,403,885 | 10/1968 | Kretzschmann | 251/144 X |
| 3,678,955 | 7/1972 | Nelson | 137/238 |
| 3,838,707 | 10/1974 | Wachowitz, Jr. | 137/327 |

Primary Examiner—William R. Cline
Attorney, Agent, or Firm—Wood, Herron & Evans

[57] ABSTRACT

An aseptic bulk storage system including an aseptic storage tank having an opening in the bottom through which bulk material passes, and an improved aseptic valve which includes an upper valve body section permanently mounted to the tank bottom and a lower valve body section detachably connected to the upper section along a common circular joint. The lower end of the upper section is provided with a circular valve seat. A valve closure plug positioned within the lower section is reciprocable vertically between an upper position engaging the seat to close the valve and a lower position disengaged from the seat to open the valve. An elongated valve stem passing through a bore in the lower housing concentric with the valve seat is connected at its upper end to the valve plug and at its lower end to an actuator mounted to the exterior of the lower section. Chemical sterilant bathes the common joint between the upper and lower sections when the valve is closed. Circular flanges extending outwardly from the upper and lower sections in combination with a circular flange-engaging clamp, permit the lower section to be rotated with respect to the upper section when the clamp is placed in a partially released condition.

15 Claims, 5 Drawing Figures

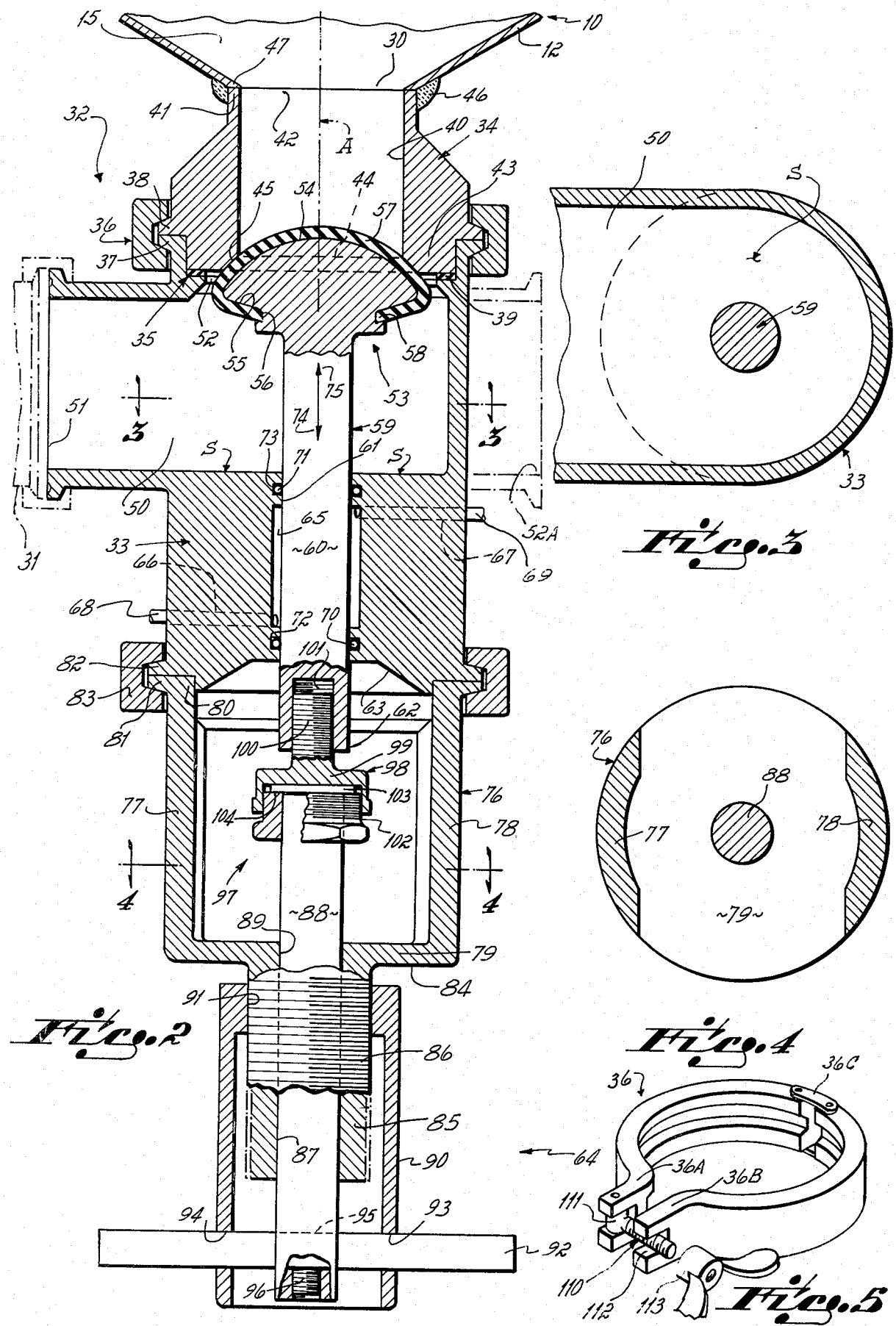

ASEPTIC BULK MATERIAL STORAGE SYSTEM AND IMPROVED ASEPTIC VALVE THEREFOR

SUMMARY OF INVENTION

This invention relates to the storage of bulk material under aseptic conditions, and more particularly to an improved aseptic valve for controlling the flow of bulk material between an aseptic storage tank and a bulk material conveying line.

In the processing of edible material, and prior to final packaging in smaller units for consumer use, it is often desirable to store large quantities of the material in bulk form and to do so under aseptic conditions to insure ultimate purity of the material as supplied to the consumer. Often the edible bulk material must remain in the storage tank for protracted periods of time. Such is the case with, for example, tomato products, fruit and the like which are sold throughout the year, yet available for harvesting during only a few months of each year.

In view of the protracted nature of the storage, it is necessary that all possible steps be taken to avoid admission into the tank of contaminants, such as microorganisms which when admitted even in only small quantities will eventually contaminate the entire tank. To this end, it has been the practice in aseptic bulk storage systems to provide, among other things, valves for controlling the flow of bulk material to and from the tank which incorporate structural features specifically designed to prevent the infiltration of contaminants into the interior of the valve via various joints which exist between the components of the assembled valve structure, such as the interface between the movable valve stem and the bore in the valve body in which the movable stem slidably interfits. Illustrative of a valve incorporating such aseptic construction is that disclosed and claimed in U.S. Pat. No. 3,678,955.

Accordingly, it has been an objective of this invention to provide an aseptic valve suitable for use in controlling the flow of bulk material relative to a bulk storage tank which has improved anti-contamination characteristics. This objective has been accomplished in accordance with certain principles of this invention by providing, in a valve of the type having an internal cavity in which is positioned a movable valve closure plug and through which the bulk material flows when the plug is moved to its open position, a valve cavity which is characterized by having a smooth internal surface in the lowermost or bottom portion thereof which is free of depressions and the like. Such a smooth depressionless cavity bottom surface promotes free drainage of bulk material and other matter from within the valve cavity and thereby prevents the accumulation within the valve cavity of material which, if permitted to remain, could constitute a source of contamination.

In accordance with certain further principles of this invention, an aseptic valve of improved anti-contamination characteristics is provided by constructing the body of valve in two discrete sections such that the common joint between the two sections is exposed to the valve cavity when the valve is closed by engagement of the plug and seat. With such a construction it is possible, by filling the cavity with chemical sterilant when the valve is closed, to bathe with chemical sterilant the joint between the two valve body sections, which joint is exposed to the cavity, thereby preventing infiltration of contaminants into the valve cavity along the mating surfaces of the assembled valve body sections which define the common joint therebetween.

In a preferred form of the aseptic valve of this invention, the valve includes an upper valve body section permanently mounted to the bottom of the aseptic tank such that a through-passage therein communicates with the tank interior, and a lower valve body section detachably mounted to the upper valve body section and having a cavity herein which communicates via one port with the passage in the upper valve body section and via another port with a bulk material conveying line. A valve closure element in the form of a plug located in the cavity is positionable via a stem, which extends through the lower valve body section, between an upper position in engagement with a valve seat formed at the lower end of the upper valve body and a lower position disengaged from the seat which establishes a material flow path between the bulk material conveying line and the tank via the passage in the upper valve body section and the cavity in the lower valve body section. The common joint between the assembled upper and lower valve body sections is located such that it is exposed to the cavity when the valve closure element is in its upper closed position engaged with the valve seat. Thus, when the valve is closed and the joint between the upper and lower valve body sections exposed to the cavity, flooding of the cavity with chemical sterilant bathes the joint to prevent infiltration of contaminants into the cavity via the mating surfaces of the upper and lower valve body sections which establish the joint therebetween. The preferred embodiment is also constructed such that the bottom surface of the cavity formed in the lower valve body section is smooth and free of depressions, thereby promoting free drainage of material from the cavity and preventing the accumulation of material within the cavity, which if permitted to occur could constitute a source of contamination within the valve.

It has been a further objective of this invention to provide, in an aseptic valve of the type described, the capability of re-orienting the port in the cavity of the lower valve body section which connects to the main bulk material conveying line, while maintaining the valve in a closed condition. This objective has been accomplished in accordance with certain further principles of this invention by providing, in the preferred embodiment, the upper and lowr valve body sections with outwardly extending flanges proximate the common joint therebetween and a selectively partially releasable clamp engaging the flanges, and by further providing an actuator means mounted to the lower housing section for urging the stem and in turn the closure plug into engagement with the seat when the clamping means is in its partially released condition. The partially releasable clamp alternatively (a) fully clamps the flanges together in compression whereby relative rotational motion between the upper and lower valve body sections about the axis of the stem is prevented, or (b) partially unclamps the flanges whereby relative rotational motion about the stem axis is possible, while permitting only negligible motion of the body sections parallel to the stem axis. The valve remains closed during the partially unclamped, valve body section rotation step by reason of the actuator which continues to urge the plug into engagement with the valve seat.

In a preferred form of this invention, the flanges, common joint between the upper and lower valve body sections, valve seat, and the bore in the lower valve body section in which the stem reciprocates are all located concentric to the axis of the stem such that when the clamp is in its partially released condition and the lower valve body section rotated with respect to the upper valve body section, the closure plug will not move relative to the valve seat against which it is urged by the actuator. As a consequence of this absence of relative motion between valve plug and seat, the engaged sections of the plug and seat are not subjected to unnecessary wear during rotation of the lower valve body section with respect to the upper valve body section, nor is the seal between the engaged valve plug and seat subjected to the risk of possibly becoming unsealed as could occur were relative motion between the plug and seat to take place during rotation of the upper and lower valve body sections.

These and other objectives and advantages of the invention will become more readily apparent from a detailed description of the invention taken in conjunction with the drawings in which:

FIG. 2 is an enlarged cross-sectional view, taken thru the aseptic valve of this invention;

FIG. 3 is a cross-sectional view taken along line 3—3 of FIG. 2;

FIG. 4 is a cross-sectional view taken along line 4—4 of FIG. 2; and

FIG. 5 is a perspective view of a preferred form of a partially releasable flange-engaging clamp useful in securing the upper and lower valve body sections to each other.

Figure 1:
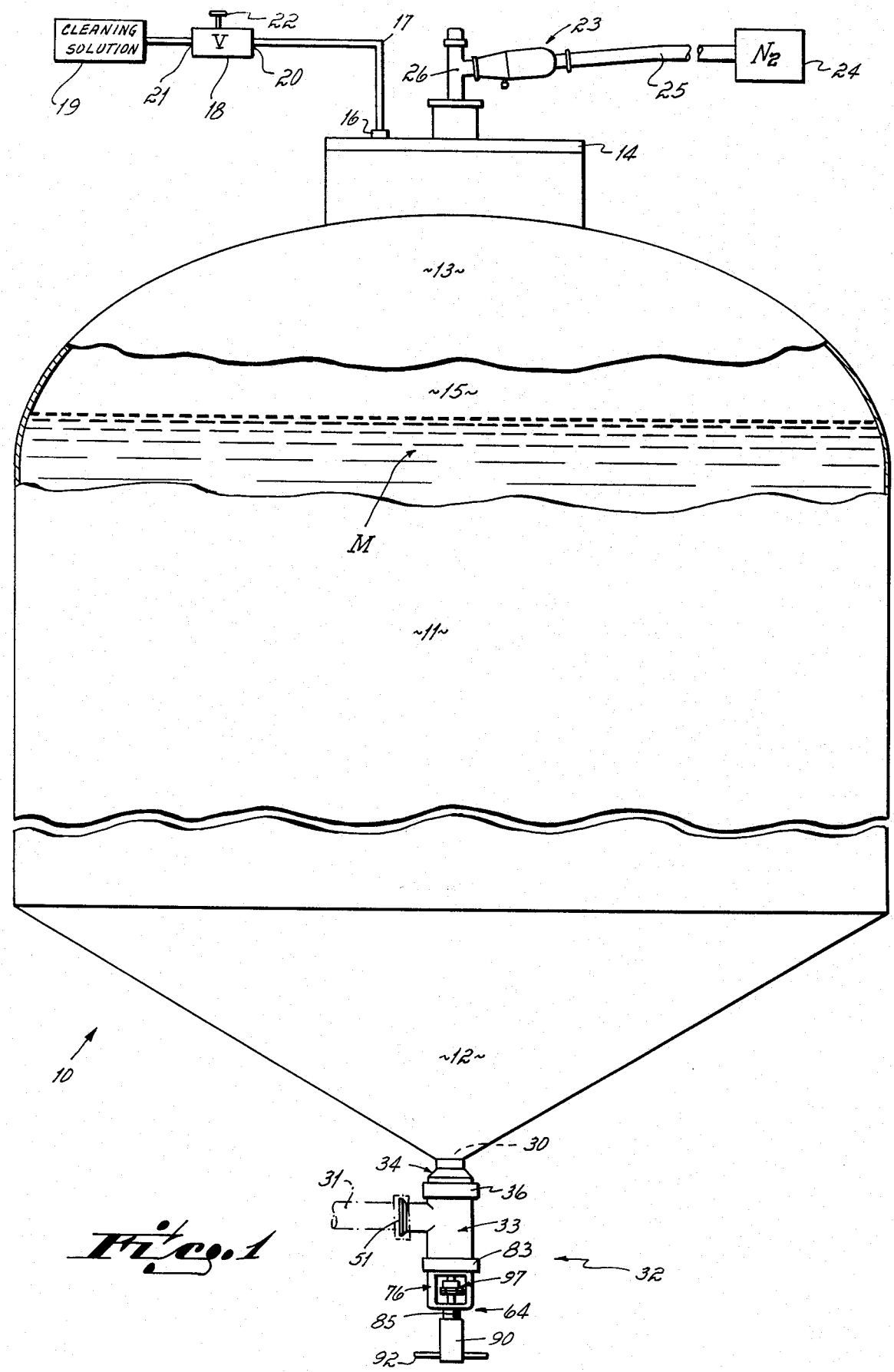
FIG. 1 is a front elevational view in cross-section of an aseptic storage system embodying, in combination with a bulk storage tank, the aseptic valve assembly of this invention.

Aseptic bulk storage systems of the type to which the aseptic valve assembly of this invention relates, as shown in FIG. 1, typically include, among other things, a large storage tank 10 in which previously sterilized bulk material M, such as crushed tomatoes, fruit or the like, is adapted to be stored under aseptic conditions. Preferably the storage tank has a cylindrical midsection 11 closed at the bottom with a conical, or funnel-shaped, bottom section 12 and at the top with a domed section 13, the latter section being provided with a selectively removable flanged manhole cover 14. The flanged manhole cover 14 permits maintenance personnel to enter the interior 15 of the tank for maintenance purposes. The funnel-shaped bottom section 12 facilitates removal of stored material M from the tank interior 15 by gravity action.

The tank 10 can be of any suitable size and shape, and preferably is fabricated of welded steel sections to which is secured to the inside surfaces thereof a protective lining of glass, plastic, or the like. Such lined steel tanks are commercially available from a number of sources including The Bishopric Products Company, Cincinnati, Ohio.

As described in more detail in U.S. Pat. No. 3,678,955, the tank 10 is provided with a cleansing port 16 through which liquid cleansing solution can be introduced for cleansing and flushing the interior of the tank when emptied of stored material. A conduit, or pipe, 17 which is connected at one end to the cleansing port 16 is also provided to facilitate cleansing of the tank interior. An aseptic valve 18 controls the flow of cleansing solution from a source 19 to the interior 15 of the tank via the pipe 16 and including an outlet port 20 connected to the conduit 17 and an inlet port 21 connected to the source of cleansing solution 19. The ports 20 and 21 of valve 18 can be selectively interconnected to permit the flow of cleansing solution from the supply 19 to the interior 15 of the tank 10 via pipe 17 by movement of a valve actuator 22.

Also included in the aseptic bulk storage system is a filter assembly 23 connected at its upstream end to a pressurized unsterilized oxygen-free gas source 24, such as nitrogen, via a pipe 25. At its downstream end the filter assembly 23 is connected to the tank interior 15 via a pipe 26 which at its lower end is secured to the manhole cover 14 and communicates with the interior 15 of the tank 10 via a suitably located port or opening located therein. Located within the filter assembly 23 is a gas pervious microbiological filter element (not shown) for filtering the unsterilized nitrogen gas from source 24 as it flows into the interior 15 of the tank 10 via pipes 25 and 26. A preferred nitrogen filter assembly 23 is disclosed in the copening application of Steve A. Rechtsteiner et al., entitled "Aseptic Storage System For Bulk Materials and Improved Microbiological Filter Therefor," filed on even date herewith.

The nitrogen from source 24 after suitable filtering in the filter assembly 23 fills with nitrogen the unused volume of the tank interior 15 above the surface of the bulk material M. In this way, air located in the unused volume above the bulk material M, which contains oxygen and supports the growth of contaminating microorganisms, is substituted by nitrogen which does not support micro-organism growth. Nitrogen is relatively inexpensive, non-explosive and is chemically inert with respect to common edible materials of the type typically stored in the tank 10. Additionally, the nitrogen, when suitably filtered by the microbiological filter element of the filtering assembly 23, does not in and of itself constitute a source of contamination for the bulk material M in the tank 10 when the nitrogen is introduced into the unused tank volume above the bulk material.

The tank 10 is also provided with an inlet/outlet opening 30 in the wall of the funnel-shaped bottom section 12 at its lowermost portion, or apex. Bulk material passes through the inlet/outlet opening 30 when the tank is being filled, being emptied, or a sample of filled material removed for testing. Interconnected between the tank inlet/outlet opening 30 and a main bulk material conveying conduit, pipe or line 31 is a "T" valve 32 constructed in accordance with the principles of this invention and described more fully hereafter. The valve 32 facilitates filling and emptying the tank with bulk material, and in conjunction with other suitable aseptic plumbing connected in the bulk material conveying line 31 permits the removal of samples from the tank for test purposes, as described in more detail in the above-referenced patent.

The T valve 32 of this invention depicted in FIG. 1, considered in more detail in FIG. 2, includes a first, or major, valve body section 33 and a second, or minor, valve body section 34 which are detachably coupled in operative relation, as shown in FIG. 2, along a common circular joint in sandwiching relation to a circular gasket 39 by a conventional circular clamp 36. Clamp 36 engages circular flanges 37 and 38 which project radially from the valve body sections 33 and 34, compressing a gasket 39 to provide a seal along joint 35 between valve body sections 33 and 34.

Minor valve body section 34 includes a passage 40 therethrough which at the upper or outer end 41 of the valve body section 34 terminates in an outer opening 42 which is coextensive and underlies the inlet/outlet opening 30 in the funnel-shaped bottom tank section 12. The passage 40 in the minor valve body section 34 terminates at the inner end 43 of the minor valve body section 34 in an inner opening 44 which is surrounded by a frustoconical valve seat 45 formed on the inner end 43 of the valve body section 34. The minor valve body 34 is preferably permanently secured to the bottom tank section 12 by suitable means, such as a weldment 46, which joins the outer end 41 of the valve body section 34 and the lowermost wall section or rim 47 which defines the inlet/outlet opening 30 of the tank 10.

The major valve body section 33 includes a cavity 50 formed in the interior thereof which communicates with a first port 51, which in turn communicates with the bulk material conveying line 31, and a second port 52 proximate the joint 35 which surrounds and is radially outwardly spaced from the circular valve seat 45. Located within the cavity 50 is a valve closure element 53, preferably in the form of a plug, having a foward spherical surface 54 and a rear, approximately frustoconical shaped surface 55 terminating at its inner edge in a circular recess 56. A resilient lining or skin 57, preferably fabricated of plastic or rubber, covers the surfaces 54 and 55 of the plug closure element 53. The peripheral edge 58 of the lining 57 snugly seats in the circular recess 56 to prevent bulk material or other foreign matter from lodging underneath the lining.

Extending rearwardly and downwardly from the valve closure plug 53 is an elongated circular cross-section valve stem 59 which at its upper end is fixedly secured to plug 53. The stem 59 has an intermediate section 60 which extends through a suitably positioned bore 61 formed in the major valve body section 33. The outer end 62 of the valve stem 59 projects beyond the outer surface 63 of the major valve body section 33 for connection, in a manner to be described, to a valve actuator 64 mounted on the major valve body section 33.

The opening 52 in the upper end of the lower valve body section 33 is preferably designed to exceed in diameter the diameter of the closure element 53 to permit the plug 53 and stem 59, as a unit and without disassembly, to be inserted and removed from their respective operative positions in the cavity 50 and the bore 61, respectively.

The valve stem 59 reciprocates axially in bore 61 between an inner or upper position shown in FIG. 2 (solid line) in which the lining 57 on the spherical surface 54 of the closure element 53 engages the valve seat 45 to close the valve, and an outer or lower position (not shown) in which the closure element 53 is disengaged from the valve seat 45 to place the valve in an open condition. In the open position, bulk material flows between the tank interior 15 and the bulk material conveying line 31 via openings 30,42, passage 40, the opening 44 which is surrounded by seat 45, port 52, cavity 50, and opening 51. When the closure element 53 and seat 45 are engaged, the flow of bulk material between the tank interior 15 and the bulk material conveying line 31 is prevented.

Surrounding the intermediate portion 60 of the valve stem 59 and formed in the major valve body section 23 extending radially outwardly from the bore 61 is an annular cross-section recess 65 which is designed to be continuously flooded with chemical sterilant. The sterilant establishes an aseptic barrier around the reciprocating valve stem to prevent entry into the cavity 50, and in turn the tank interior 15 and bulk material conveying line 31, of contamination present at the point where the lower end of the bore communicates with the housing surface 63. An inlet passage 66 located at the bottom and an outlet passage 67 located at the top which communicate at their inner ends with recess 65 and at their outer ends with suitable inlet and outlet sterilant flow pipes 68 and 69 facilitate flooding of the recess 65 in the manner described. Location of inlet passage 66 and outlet passage 67 at the bottom and top, respectively, of sterilant chamber 65 prevents entrapment of air in the top of chamber 65 when sterilant is introduced into the chamber. O-rings 70 and 71 located in circular recesses 72 and 73 surrounding the intermediate stem section 60 establish a seal between the stem and the bore 61 on either side of the sterilant-containing recess 65.

To reciprocate the valve stem 59 in the direction of arrows 74 and 75 to open and close the valve, respectively, the valve actuator 64 is provided. Actuator 64 includes a main body in the form of a yoke 76 having oppositely disposed legs 77 and 78 which are integrally connected at their lower ends with a circular disc 79 and at their upper ends with an annular ring or rim 80 which has extending from it a flange 81. Flange 81 cooperates with a similarly constructed flange 82 formed on the major valve body section 33 to facilitate detachably mounting the valve actuator 64 to the major valve body section 33 with a circular clamp 83.

Extending outwardly and downwardly from the exterior surface 84 of the disc 79 is a tube 84 having a threaded exterior surface 86 and an internal bore 87 through which a valve stem actuating shaft 88 slidably passes. A suitably located opening 89 formed in the disc 79 is provided to accommodate the passage of the shaft 88. Cooperating with the tube 85 is a second tube 90 which has an interior threaded section 91 which threadedly engages the exterior threaded surface 86 of the inner tube 85 to facilitate axial displacement of the tube 90 relative to the tube 85 when the former tube is rotated.

A handle 92 in the form of a rod passing through aligned bores 93 and 94 in the outer tube 90 and bore 95 in the outer end of the shaft 88 is provided to facilitate rotation and axial displacement of the tube 90 as well as axial displacement (and rotation) of the shaft 88 which rotates and moves axially with the tube 90 by means of the interconnecting handle 92. A screw 96 threaded axially into the shaft 88 abuts at its inner end the handle 92 to prevent radial movement of the handle 92 relative to shaft 88.

To transmit axial displacement from the rotating shaft 88 to the valve stem 59 without rotating the latter, a connecting assembly 97 is provided. The connecting assembly 97 includes an internally threading bushing-like member 98 which has extending from its disc-like bottom 99 a threaded stub 100 which threadedly engages a suitably provided internally threaded blind hole 101 formed in the outer end 62 of the valve stem 59. The connecting assembly 97 further includes an externally threaded bushing 102 which engages the internally threaded bushing-like member 98 to prevent axial movement of the large head 103 of the shaft 88 relative to the bushing-like member 98. When the bushing 102 is threadedly engaged with the bushing-like member 98, the enlarged head 103 of the shaft 88 is positioned between the bottom surface 99 of the disc-like portion of the bushing 98 and the upper annular rim 104 of the bushing 102. While axial motion of the enlarged head 103 of shaft 88 relative to the bushing-like element 98 is prevented by the bushing 102, suitable clearance is provided to permit the enlarged head 103 to rotate axially relative to the bushing members 98 and 102 such that as the shaft 88 is rotated by handle 92 and displaced axially, only its axial movement will be imparted to the valve stem 59 and not its rotational motion.

In operation, the tank 10 is filled by, among other things, reciprocating the valve stem 59 in the direction of arrow 74 to disengage the closure plug 53 and the valve seat 45, and thereafter pumping or otherwise forcing bulk material from the line 31 into the tank interior 15 via cavity 50 and passage 40. After the tank 10 has been filled to the extent desired, the valve 32 is closed by reciprocating the valve stem 59 in the direction of arrow 75 to engage the closure plug 53 and the valve seat 45.

Following filling of the tank and closing of the valve 32, the cavity 50 is flooded with chemical sterilant. With the cavity 50 so flooded, the joint 35 between the major valve body section 33 and the minor valve body section 34 is bathed in chemical sterilant preventing infiltration into the valve cavity 50, and ultimately into the tank interior 15 via passage 40, of contamination which might seek to enter via the cooperating and mating surfaces of the two valve body sections in the region of the flanged coupling joint 35 established by flanges 37 and 38 and circular clamp 36. Thus, by locating the joint 35 upstream of the valve seat 45, the term "upstream" being construed in the context of a flow from line 31 to the tank interior 15 via cavity 50 and passage 40, the flooding of cavity 50 with chemical sterilant following tank filling and valve closure will have the effect of bathing the joint 35 with chemical sterilant to prevent infiltration into the interior of the tank of contaminants which would attempt to enter via the flange coupling established by elements 36, 37 and 38.

To further limit the likelihood of contamination of the contents of the tank 10, the lowermost interior surfaces S, S of the cavity 50 formed in the valve body 33 is purposely constructed to be smooth and free of any depressions, recesses or the like which would prevent free drainage of the cavity 50 or otherwise cause bulk material, foreign matter, or the like to collect or accumulate in the cavity 50. Thus, by constructing the bottom surface S, S of the cavity 50 smooth and free of depressions, recesses and the like, the cavity can drain freely, and bulk material, foreign matter or the like will not accumulate or collect in the cavity which, if permitted to occur, would constitute a potential source of contamination for the tank interior.

A further advantage of the valve 32 of this invention is that it is possible to rotate the major valve body section 33 about the axis of the valve stem 59 relative to the minor valve body section 34 while simultaneously maintaining the valve in a closed condition by engagement of the closure element 53 and valve seat 45. Such is achieved by orienting joint 35, flanges 37 and 38, seat 45, plug 53, stem 59 and bore 61 along a common axis A; providing a circular clamp 36 and flanges 37 and 38, or similar means, which permit relative rotational movement between valve body sections 33 and 34 while limiting to a negligible amount relative axial movement therebetween; and by providing an actuator 64 which maintains the plug 53 and seat 45 engaged under conditions of limited axial displacement of body sections 33 and 34.

The foregoing rotation of valve body sections 33 and 34 is accomplished by slightly loosening, or partially releasing, the circular clamp 36 such that the flanges 37 and 38 can rotate relative to each other about their common axis A, while maintaining the closure element 53 engaged with the seat 45 by means of actuator 64. With the flanges 37 and 38 free to rotate relative to each other and with the plug element 53 and seat 45 engaged, the valve body 33 is then rotated about the axis A relative to valve body 34. Following rotation of the major valve body section 33 relative to the minor valve section 34 to the degree desired, the circular clamp 36 is again tightened to prevent relative rotational movement of the flanges 37 and 38.

Thus, by providing the flanges 37 and 38, joint 35, seat 45, valve stem 59 and bore 61 with a common axis, providing means in the form of a valve actuator or the like to maintain the closure plug 53 in engagement with the seat 45, and by providing connection means in the form of clamp 36 and flanges 37 and 38 or the like, which permit relative rotational movement of the minor and major valve body sections 33 and 34 while restricting significant axial movement, it is possible to rotate, while maintaining the valve 32 in a closed condition, the major valve body section 33 and, hence, the opening or port 51, relative to the minor valve body section 34 and tank 10.

It is possible to rotate the major and minor valve body sections 33 and 34 relative to each other without making the joint 35, flanges 37 and 38, seat 45, stem 59 and bore 61 coaxial. However, it is preferable that these elements be made coaxial. Specifically, by making the joint 35, flanges 37 and 38, seat 45, stem 59 and bore 61 coaxial, when the major housing 33 is rotated relative to the minor housing 34, the valve plug 53 and seat 45 will not undergo any relative movement with respect to each other. Prevention of relative movement between seat 45 and the valve plug 53 is desirable because it avoids undue wear of the seat 45 and plug lining 57, as well as reduces the possibility of leakage between the seat and plug valve lining during rotation.

While the preferred embodiment of the invention discussed in connection with FIGS. 1–4 has been described with reference to a T-valve in which the tank 10 communicates with a single port 51, the principles of this invention can also be applied to valves of other types. For example, the T-valve depicted in FIGS. 1–4 can be modified as shown in phantom lines in FIG. 2 such that a cross-valve is provided. This is accomplished by providing a second opening 52A in the lower main body section 33 which communicates with the cavity 50. With oppositely disposed openings 52 and 52A provided in the major valve body section 33, both of which communicate with the cavity 50, a cross-valve is provided.

The circular clamp 36 shown in vertical cross-section in FIG. 2 and in perspective in FIG. 5 preferably takes the form of a split ring 36 hinged at an intermediate point 36C and having ends 36A and 36B which are slightly spaced from each other when the clamp is in its operative position. A threaded fastener 110 pivotally connected at its end 111 to one of the clamp ends 36A fits in a slot 112 formed in the other clamp end 36B and is provided with a thumbscrew 113 which, when the threaded fastener is in its slot 112 and the thumbscrew tightened, clamps the flanges 37 and 38 engaged by the clamp, and which when loosened partially releases the clamp permitting the flanges 37 and 38 and their associated valve body sections 33 and 34 to rotate relative to each other. The clamp 36 when in its released condition permits only negligible axial movement of the valve body sections 33 and 34 relative to each other. Clamp 83 can be constructed similarly to clamp 36 for engaging flanges 81 and 82 to secure the actuator 76 to the lower valve body section 33.

Having described the invention, it is claimed:

1. Apparatus for storing bulk material under aseptic conditions comprising:
   an aseptic tank having an opening in the wall thereof through which sterile bulk material passes when filling and/or emptying said tank, and
   an aseptic valve connected between said tank opening and a bulk material conveying line, said valve including
   a. a valve seat,
   b. a valve closure element selectively positionable in engagement and disengagement with said seat to close and open said valve, respectively,
   c. first and second cooperating valve body sections, said first body section having a cavity therein in which said valve closure element is positioned, a first port in said first body section connecting said cavity with said conveying line, a second port in said first body section also connecting to said cavity, said second body section having a passage therethrough terminating at an inner end in an inner opening surrounded by said valve seat and at an outer end in an outer opening,
   d. means mounting said outer end of said second body section to said tank at an interface therebetween to connect said tank opening and said outer end of said passage, said mounting means being free of relatively rotatably movable surfaces of said second body section and tank through which contaminants can infiltrate directly into said tank should said first and second valve body sections rotate relative to each other,
   e. means mounting said first body section to said inner end of said second body section along a common joint to connect said inner opening of said second body section to said cavity via said second port, said common joint being exposed to said cavity when said closure element and seat are engaged,
   f. a valve stem connected at its inner end to said closure element and extending through said first valve body section for moving said closure element between its engaged and disengaged positions to close and open said valve, respectively, and
   g. means incorporated in said first valve body section for establishing an aseptic barrier around said valve stem to prevent infiltration of contaminants into said cavity along the interface between said valve stem and first valve body section.

2. The apparatus of claim 1 wherein the lowermost interior surface of said cavity is free of depressions to promote drainage of said cavity via said first port and thereby prevent the accumulation of material in said cavity which could constitute a source of contamination.

3. The apparatus of claim 1 wherin said valve closure element includes a plug having a forward surface facing said valve seat and a rear surface remote therefrom which terminates in a circular recess formed in the periphery of said valve stem adjacent the inner end thereof, and a resilient lining overlying said forward and rear surfaces having a peripheral edge positioned in said recess to prevent material from lodging underneath said lining and thereby constituting a source of contamination.

4. The apparatus of claim 1 further including fluid sterilant completely filling said cavity when said valve is closed for establishing an aseptic barrier at said exposed joint to prevent infiltration of contaminants into said cavity via said joint.

5. The apparatus of claim 1 wherein said second port of said first valve body section is dimensioned to permit said valve closure element and stem to be inserted into said cavity from outside thereof, without disassembling said closure element and stem, when said first body section is demounted from said second body section.

6. The apparatus of claim 1 wherein said valve closure element includes a surface section engageable with said seat to seal said passage, and wherein said surface section, seat and joint are all circular and coaxially located relative to said stem, and further including a connector incorporated in said stem for permitting a force to be applied to said closure element to urge said closure element surface section and seat into sealing engagement while said first body section rotates relative to said closure element and seat about said stem, said apparatus further including an actuator operatively interconnecting said first body section and said stem for maintaining, in cooperation with said connector, said closure element surface section and seat engaged, without relative movement therebetween and thereby maintaining said valve closed, and the seal unbroken between said seat and closure element surface section, while said first valve body section rotates relative to said second valve body section about the common axis of said seat, closure element surface section, joint and stem.

7. The apparatus of claim 6 wherein said mounting means includes cooperating flanges concentric with said stem axis and extending outwardly from said first and second body sections, and a selectively partially releasable clamp engaging said flanges to alternatively a) fully clamp said flanges together in compression whereby relative rotational motion between said body sections is prevented, or b) partially unclamp said flanges whereby relative rotational motion about said stem axis is possible while permitting only negligible longitudinal motion of said body sections parallel to said stem axis.

8. An aseptic storage system for storing bulk material under aseptic conditions comprising:
   an aseptic tank having an interior for storing material and an opening in the wall thereof through which bulk material passes, and
   a valve connected between said tank opening and a material conveying line for controlling the flow of material between said tank and conveying line, said valve including a. a valve seat,
b. a minor valve body section mounted to said tank wall, said minor valve body section having a through passage therein communicating at one end with said tank interior via said tank wall opening and at the other end with said valve seat, said mounting providing no relatively rotatably movable surfaces of said minor body section and tank through which contaminants can infiltrate directly into said tank should said major and minor valve body sections rotate relative to each other,
c. a valve closure element positionable between engaged and disengaged positions relative to said seat for closing and opening said valve,
d. a major valve body section selectively mountable to said minor valve body section to establish a common joint and containing a cavity therein to which said joint is exposed when said closure element and seat are engaged and in which said valve closure element is positioned, said major valve body section having a first port therein communicating with said passage via said valve seat and a second port therein communicating with said material conveying line
e. an elongated valve stem extending through a bore in said main valve body located opposite said first port, said stem being connected to said valve closure element at its inner end to move said closure element between its seat-engaging and seat-disengaging positions when said stem moves axially between inner and outer positions, and
f. means incorporated in said main valve body for establishing an aseptic barrier around said valve stem to prevent infiltration of contaminants into said cavity along the interface between said valve stem and main valve body section.

9. The apparatus of claim 8 wherein said seat is circular and said closure element includes a surface section engageable with said seat, and wherein said seat and common joint are coaxial with said stem, and further including a connector incorporated in said stem for permitting a force to be applied to said closure element to urge said closure element surface section and seat into sealing engagement while said major body section rotates relative to said closure element and seat about said stem, said apparatus further including an actuator mounted on said main valve body and connected to said stem for axially moving said stem to selectively engage and disengage said closure element and said seat, said actuator being operative, in cooperation with said connector, for maintaining said surface section of said closure element and seat engaged without relative movement therebetween and thereby maintaining said valve closed and the seal unbroken between said seat and closure element surface section while said major valve body section is rotated relative to said minor valve body section about said common axis of said seat, joint and stem.

10. In an aseptic storage system having an aseptic tank for storing bulk material under aseptic conditions, which tank is provided with an opening in the wall thereof through which bulk material passes, the improvement comprising:

an aseptic valve connectable between said tank opening and a bulk material conveying line, said valve including a. a valve seat,
b. a valve closure element selectively positionable in engagement and disengagement with said seat to close and open said valve, respectively,
c. first and second cooperating valve body sections, said first body section having a cavity therein in which said valve closure element is positioned, a first port in said first body section connecting said cavity with said conveying line, a second port in said first body section also connecting to said cavity, said second body section having a passage therethrough terminating at an inner end in an inner opening surrounded by said valve seat and at an outer end in an outer opening, said outer end being mountable to said tank to connect said tank opening and said outer end of said passage,
d. means mounting said first body section to said inner end of said second body section along a common joint to connect said inner opening of said second body section to said cavity via said second port, said common joint being exposed to said cavity when said closure element and seat are engaged, said mounting means being free of relatively rotatably movable surfaces of said second body section and tank through which contaminants can infiltrate directly into said tank should said first and second valve body sections rotate relative to each other,
e. a valve stem connected at its inner end to said closure element and extending through said first valve body section for moving said closure element between its engaged and disengaged positions to close and open said valve, respectively, and
f. means incorporated in said first valve body section for establishing an aseptic barrier around said valve stem to prevent infiltration of contaminants into said cavity along the interface between said valve stem and first valve body section.

11. The apparatus of claim 10 further including fluid sterilant completely filling said cavity when said valve is closed for establishing an aseptic barrier at said exposed joint to prevent infiltration of contaminants into said cavity via said joint.

12. The apparatus of claim 6 wherein the lowermost interior surface of said cavity is free of depressions to promote drainage of said cavity via said first port and thereby prevent the accumulation of material in said cavity which could constitute a source of contamination.

13. The apparatus of claim 8 wherein the lowermost interior surface of said cavity is free of depressions to promote drainage of said cavity via said first port and thereby prevent the accumulation of material in said cavity which could constitute a source of contamination.

14. The apparatus of claim 9 wherein the lowermost interior surface of said cavity is free of depressions to promote drainage of said cavity via said first port and thereby prevent the accumulation of material in said cavity which could constitute a source of contamination.

15. The aseptic valve of claim 10 wherein said valve closure element includes a surface section engageable with said seat to seal said passage, and wherein said surface section, seat and joint are all circular and coaxially located relative to said stem, and further including a connector incorporated in said stem for permitting a force to be applied to said closure element to urge said closure element surface section and seat into sealing engagement while said first body section rotates relative to said closure element and seat about said stem, said apparatus further including an actuator operatively interconnecting said first body section and said stem for maintaining, in cooperation with said connector, said closure element surface section and seat engaged, without relative movement therebetween and thereby maintaining said valve closed, and the seal unbroken between said seat and closure element surface section, while said first valve body section rotates relative to said second valve body section about the common axis of said seat, closure element surface section, joint and stem.

* * * * *

UNITED STATES PATENT OFFICE
CERTIFICATE OF CORRECTION

PATENT NO. : 3,918,678
DATED : November 11, 1975
INVENTOR(S) : Steve A. Rechtsteiner et al It is certified that error appears in the above-identified patent and that said Letters Patent are hereby corrected as shown below:

Column 2, line 47, "lowr" should be --lower--.

Column 4, line 1, "including" should be --includes--.

Column 4, line 21, "copening" should be --copending--.

Column 5, line 26, "foward" should be --forward--.

Column 6, line 38, "84" should be --85--.

Signed and Sealed this fourth Day of May 1976

[SEAL]

Attest:

RUTH C. MASON
Attesting Officer

C. MARSHALL DANN
Commissioner of Patents and Trademarks